United States Patent
Fehr et al.

(10) Patent No.: US 7,428,449 B2
(45) Date of Patent: Sep. 23, 2008

(54) SYSTEM AND METHOD FOR DETERMINING A WORKLOAD LEVEL OF A DRIVER

(75) Inventors: Walton L. Fehr, Mundelein, IL (US); Judith L. Gardner, Detroit, MI (US); R. John Hansman, Jr., Cambridge, MA (US); Rosalind Picard, Cambridge, MA (US)

(73) Assignee: Temic Automotive of North America, Inc., Deer Park, IL (US)

( * ) Notice: Subject to any disclaimer, the term of this patent is extended or adjusted under 35 U.S.C. 154(b) by 368 days.

(21) Appl. No.: 11/375,230

(22) Filed: Mar. 14, 2006

(65) Prior Publication Data

US 2007/0219672 A1 Sep. 20, 2007

(51) Int. Cl.
*B60R 16/02* (2006.01)
*G06F 19/00* (2006.01)
*G01C 21/00* (2006.01)

(52) U.S. Cl. .............. 701/1; 701/207; 340/438
(58) Field of Classification Search ............... None
See application file for complete search history.

(56) References Cited

U.S. PATENT DOCUMENTS 6,580,984 B2 * 6/2003 Fecher et al. ............ 701/36
6,720,920 B2 * 4/2004 Breed et al. ............ 342/386
6,974,414 B2 * 12/2005 Victor ....................... 600/300
2002/0120374 A1 * 8/2002 Douros et al. ............ 701/29
2002/0198653 A1 * 12/2002 Lutter ....................... 701/209
2004/0088205 A1 * 5/2004 Geisler et al. ............ 705/7
2004/0113799 A1 * 6/2004 Geisler et al. ............ 340/576
2004/0252027 A1 * 12/2004 Torkkola et al. .......... 340/576
2005/0192730 A1 * 9/2005 Churchill et al. ......... 701/45
2005/0234617 A1 * 10/2005 Kynast et al. ............ 701/36
2006/0293799 A1 * 12/2006 Powers et al. ............ 701/1
2007/0063854 A1 * 3/2007 Zhang et al. ............. 340/576

FOREIGN PATENT DOCUMENTS

EP  1512584 A1 *  3/2005
EP  1513326 A1 *  3/2005

* cited by examiner

*Primary Examiner*—Michael J. Zanelli

(57) ABSTRACT

System and method for determining a workload level for a driver of a vehicle. The system includes a transceiver, a positioning unit, and a controller. The transceiver is capable of receiving data from a remote location. The data includes a remote workload level and a remote geographic position associated with the remote workload level. The positioning unit is capable of determining a current position of the vehicle. The controller is configured to compare the current position of the vehicle with the remote geographic location. If the current position of the vehicle is within a predetermined range of the remote geographic position, then a workload level for the vehicle will include at least in part the remote workload level.

20 Claims, 3 Drawing Sheets

SYSTEM AND METHOD FOR DETERMINING A WORKLOAD LEVEL OF A DRIVER

FIELD OF THE INVENTION

This invention in general relates to a workload determination systems in vehicles and, more particularly, to a system and method for determining a workload level of a driver based on location and data from other vehicles.

BACKGROUND OF THE INVENTION

There is a need to reduce the amount of information presented to drivers while operating a vehicle. Traditionally, any information presented to the vehicle operator, is presented without taking into account the various demands that a driving task might be to the operator at a given moment. For example, a navigation system may display an upcoming maneuver or give a verbal description of the maneuver at the same time a driver is driving through crowded streets, or poor road conditions, or while the driver is trying to get around an accident.

Human beings have a finite ability to perceive the environment, to attend to elements of the environment, to cognitively process the stimuli taken in, to draw appropriate meaning from perceptions, and to act appropriately upon those perceived meanings. Furthermore, there is a great variation within the driving population in both native and developed abilities to drive. Thus, vehicle operators are subject to confusion, distraction, and to ignorance, which is exacerbated by the barrage of stimuli they are now subjected to while operating a vehicle. Training, experience, and technology can be used to mitigate confusion, distraction, and ignorance.

Unfortunately, in the United States there is little formal or informal training in the skills involved in driving, beyond the period when people first apply for their licenses. Driver training programs have not proven to be particularly effective, nor is training continued through the driving career. In fact, in the United States, in particular, most people think of driving as a right rather than a privilege. Further, studies show that most think of themselves as good drivers and of "the other person" as the one who creates problems. Unless and until a cultural or legal change takes place that encourages drivers to improve their driving skill, it seems that technological solutions designed to minimize confusion, distraction, and ignorance have the best potential for improving the safety of the highway transportation system.

To address these and other safety concerns, an integrated safety system based on a state transition model has been proposed. The underlying concept is a "hierarchy of threat" model that steps through a series of states each one representing an assessment of the danger of an impending collision based on information from external object detectors and in-vehicle sensors. The states are "normal driving state," "warning state," "collision avoidable state," "collision unavoidable state," "post-collision state." Sensor and data fusion algorithms combine information from the sensors and determine the degree to which the danger of collision exists. If the system detects the danger of a collision it issues warnings to the driver or, in some situations, takes control of the vehicle and initiates automatic braking, automatic lane change, or other forms of vehicle control. This system represents an attempt to bring previously unrelated sensor information into an integrated state from which useful inference about the danger of collision may be made and warnings to the driver, or actual control of the vehicle, can be used to avoid completely or mitigate the damage from a collision.

There has also been proposed a system that provides extensive monitoring of the vehicle and traffic situation in order to prioritize presentation of information to the driver. The goal of this system is to manage the stream of information to the driver while taking account of the driving task, conditions, and the physical, perceptual and cognitive capacities of the driver. The support provided is designed to improve the driver's focus and to re-focus the attention of a distracted driver as the driver undertakes navigation, maneuvering and control of the vehicle. The overall system architecture incorporates an analyst/planner that accepts inputs from sensors, includes a stored repertoire of driving situations, and records information about the driver. Additionally, the system includes a dialogue controller for managing communication with the driver. The system also monitors the driver and integrates the driver's condition into the decisions made by the warning and control system.

None of the existing systems, however, take the information gained from one driver and share that information with another driver in order to improve workload determinations of a driver. There is a need to share workload experiences between mobile drivers in a geographic area. Such a system would improve the presentation of information. For example, the experience obtained from one driver in a particular geographic location can be useful to other drivers that pass through the geographic location.

It is, therefore, desirable to provide an improved workload determination system and methods to overcome or minimize most, if not all, of the preceding problems.

Figure 1:
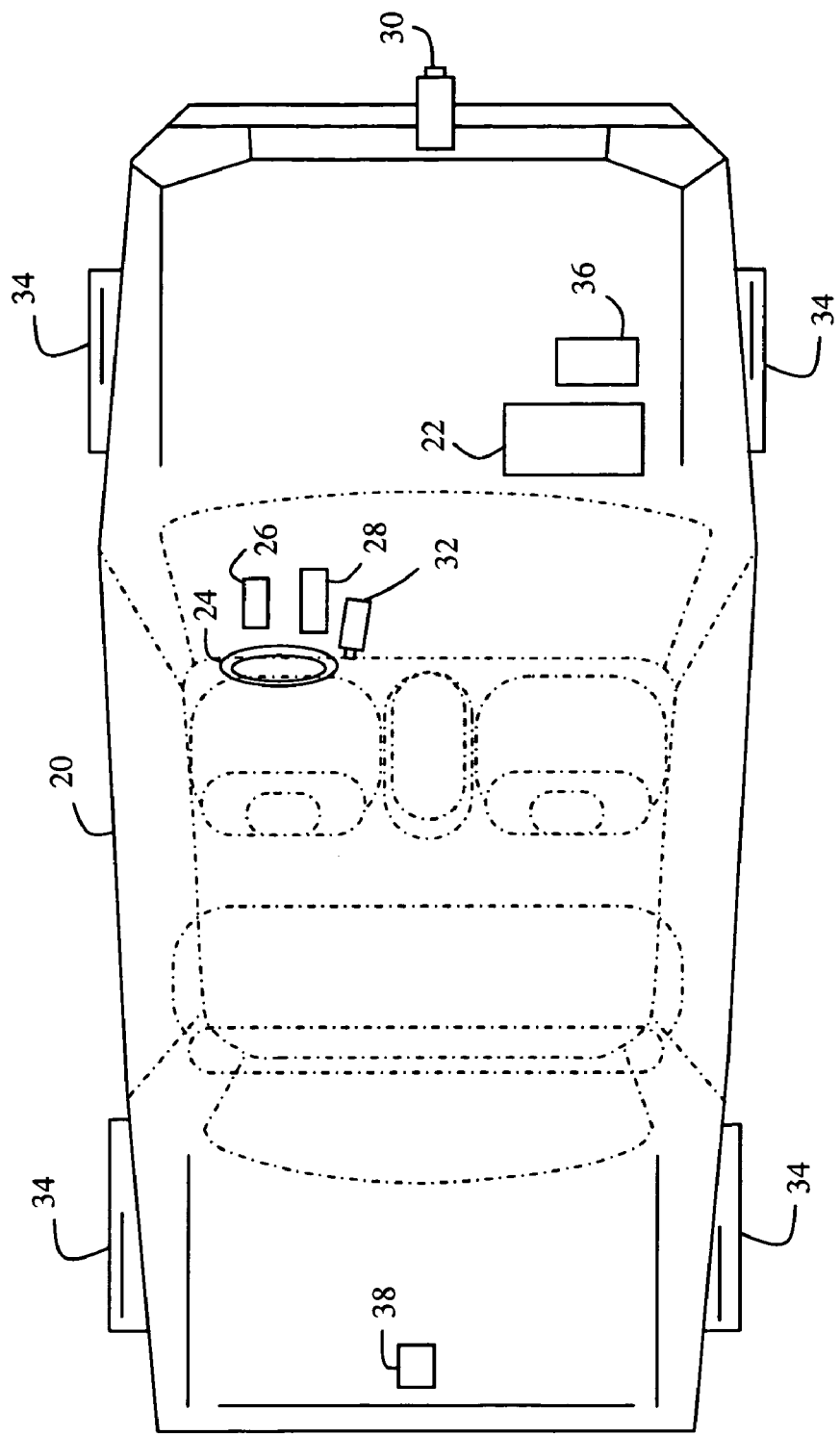
FIG. 1 is a top view of a vehicle in one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

Described herein are workload determination systems and methods for vehicles to prioritize the presentation of information to drivers. The systems and methods in the present application advantageously transmit workload related data between vehicles in order to share workload experiences at specific geographic locations.

In one embodiment, there is a system for determining a workload level for a driver of a vehicle. The system may include a transceiver, a positioning unit or other sensors, and a controller. The transceiver is capable of receiving data from a remote location. The data includes a remote workload level and information such as a geographic position, a velocity, a heading, or an acceleration associated with the remote workload level. The data may further include data derived from a plurality of sensors in a remote vehicle. The positioning unit or other sensors are capable of determining a current characteristic of the vehicle. The controller is configured to compare the current characteristic of the vehicle with the received information associated with the remote workload level. Depending on the comparison of the current characteristic of the vehicle and the received information associated with the remote workload level, then a current workload level for the vehicle may include at least in part the remote workload level. The current workload level for the vehicle may then be used to prioritize information provided to a driver of the vehicle.

In another embodiment, the present invention may include a method that comprise the steps of: receiving data from a remote location, the data including a remote workload level and information such as a geographic position, a velocity, a heading, or an acceleration associated with the remote workload level; determining a current characteristic of the vehicle; comparing the current characteristic of the vehicle with the received information associated with the remote workload level; and determining a current workload level of the driver of the vehicle wherein the current workload level is based at least in part on the remote workload level.

In a further embodiment, the present invention includes determining workload levels of drivers in vehicles. The method comprising the steps of: determining a first workload level for a first driver of a first vehicle; determining a first position of the first vehicle; associating the first workload level with the first position; transmitting the first workload level and the first position to a second vehicle; and determining a second workload level for a second driver of the second vehicle; wherein the second workload level is determined at least in part based on the first workload level and the first position.

Turning to the drawings, FIG. 1 illustrates a vehicle 20 that includes a controller 22 and various visible and hidden apparatus used for monitoring vehicle and driver operations. Shown in the vehicle is a steering wheel 24, a brake pedal 26, an accelerator 28, a camera 30 that monitors an external environment, a camera 32 that monitors an internal cabin, tires 34, a vehicle electronic control unit 36, and a positioning unit 38. Other vehicle controls used, but not depicted, in various embodiments may include a turn signal, gear shifter, door handles, and window controls, among others. The controller 22 is connected to sensors (not shown) that monitor and report the status and operation of the various vehicle components 24, 26, 28, 30, 32, 34, as well as receive information and data from the vehicle electronic control unit 36, the positioning unit 38 as discussed below. For instance, in one embodiment, the vehicle may have image sensors associated with cameras 30 and 32. Camera 30, for instance, may monitor an area in front of the vehicle to identify crowded pedestrian streets and intersections. Other sensing units like radar, laser, and ultra-sonic systems could also be used. The vehicle may further have sensors to identify specific road conditions and traction estimates, such as sensors associated with tires 34.

Figure 2:
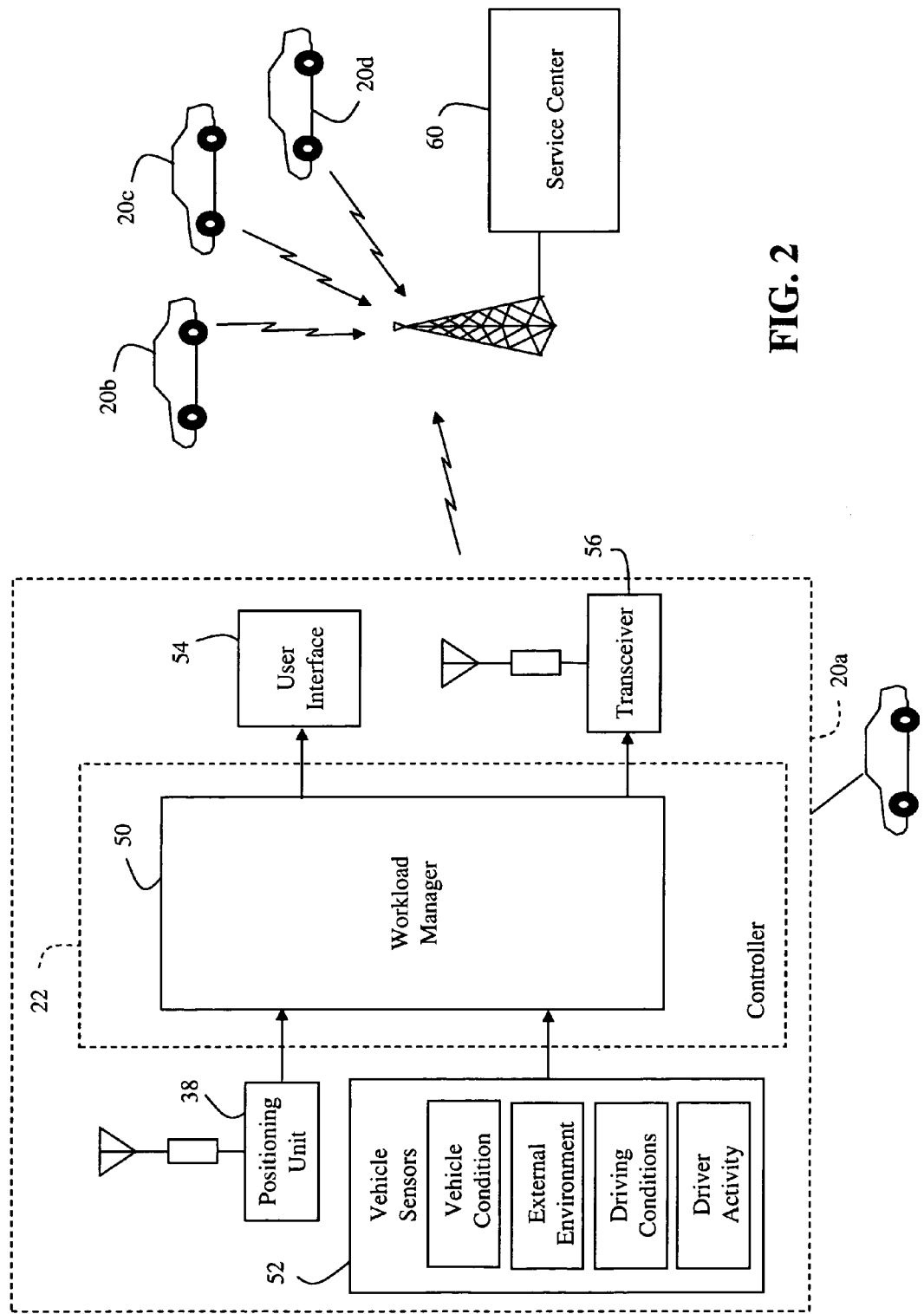
FIG. 2 is a system diagram of a plurality of vehicles that share workload determination data.

FIG. 2 illustrates one embodiment of a controller 22 having at least workload manager 50 that is connected to a positioning unit 38, a plurality of vehicle sensors 52, a user interface 54, and a transceiver 56. The positioning unit 36 may be a Global Positioning System (GPS) device, dead reckoning unit, or other device or system that determines information of the vehicle 20a such as a geographic position, a velocity, a heading, or an acceleration. In addition to the positioning unit 36, information such as velocity, a heading, or an acceleration may be determined from a plurality of vehicle sensors 52.

FIG. 2 further illustrates that the controller 22a communicates with other vehicles 20b, 20c, and 20d via one or more wireless communication links through the wireless transceiver 56. The wireless communication may be direct (i.e. vehicle to vehicle) or through a remote service center 60. The wireless communications are illustrated in FIG. 2 by communication arrows. Generally, the remote service center 60 may be configured to receive data from a plurality of vehicles 20a-20d. Those of ordinary skill in the art, having the benefit of this disclosure, will appreciate that many possible wireless communication methods may be used for communications between the vehicles 20a-20d and the remote service center 60. In one embodiment, the communications are via a cellular wireless communication such as AMPS, CDMA, GSM or TDMA. The transmissions between the vehicles 20a-20d and the remote service center 60 may also be made by other wireless communications such as a satellite communications.

One benefit of having a remote service center 60 is that it can facilitate better access to data between vehicles 20a-20d. The remote service center 60 may monitor the location of the vehicles 20a-20d and provide specific data to one or more vehicle within a geographic area, depending on the contents of the data. Additionally, the remote service center 60 may be configured to incorporate additional services such as navigation and route guidance instructions. In that case, the selected route may also include a consideration for current traffic patterns.

In any event, whether the system includes direct vehicle-to-vehicle communications or a centralized approach, the type of data that may be exchanged between vehicles 20a-20d may include specific information about the workload level of each vehicle 20a-20d. The workload levels should additionally be associated with particular geographic locations. In one embodiment, as explained in more detail below, the workload manager 50 in the controller 22 may gather specific information from a plurality of vehicle sensors on the vehicle 20a. The workload manager 50 of the controller 22 may then make a determination of the relative workload level of a driver of the vehicle 20a. This data may then be associated with a specific geographic location by determining a location from the positioning unit 38. The controller 22 may include a suitable processing device, such as a microprocessor, digital signal processor, etc., one or more memory devices including suitably configured data structures, and interfaces to couple the workload manager 50 to various vehicle sensors 52 and devices such as the user interface 54. The workload manager 50 may be an integrated single module or its functions may be performed as part of another vehicle computer system such as an engine controller.

The workload manager 50 is configured to classify an activity state of the driver of the vehicle 20 and, as explained below, the controller 50 may then prioritize the type of information displayed or otherwise provided to the driver through the user interface 54 based on the activity state of the driver. For instance, in one embodiment, the workload manager 50 will classify the driver into at least one activity state based upon sensor data from the vehicle 20a that relates to a vehicle operating condition. The workload manager 50 may also classify the driver into at least one activity state based upon sensor data from the vehicle 20a that relates to a condition of the driver. In particular, the system is adapted to access information related to a vehicle's environment and information related to other possible distractions to a driver and to provide an output for the determination of prioritizing information presented, in whole or in part, to the driver. For example, the presentation of vehicle indicators and notifications can be based upon a number of conditions relating to the vehicle operation, the vehicle environment, and the activity of the operator and other occupants.

Additionally, as explained further below, the system may incorporate workload determinations based on data received from other vehicles 20*b*-20*d* that are associated with particular geographic locations. Vehicle location may be provided by an on-board system utilizing Global Positioning System (GPS) technology, or location information may be provided by a wireless communication device (e.g., a cellular telephone) and associated wireless communication network.

As shown, data from one vehicle is captured from a variety of sources, all of which may be used directly or indirectly to infer the state of the vehicle and, moreover, the driver's cognitive load with respect to new inputs. Such data encompasses data produced by the various vehicle sensors. Vehicle condition monitoring sensors are pervasive in passenger vehicles (cars, mini-vans, sport utility vehicles, etc.) and many other vehicles. These sensors monitor numerous parameters such as engine operating parameters, vehicle speed, transmission and wheel speed, vehicle acceleration in three axes, chassis function, emission control function, etc. These sensors may also provide data related to vehicle diagnostics.

Vehicle sensors may further encompass data related to the external environment in which the vehicle is operating, e.g., the road conditions, traffic conditions, weather, etc. Road conditions, for example, road surface and traction estimates may be provided by anti-lock braking, traction control and chassis control system sensors. Radar, laser, ultra-sonic and video systems (such as camera 30) can provide a map of objects near the vehicle and their motion relative to the vehicle. Weather and time of day may also be monitored directly or derived from sources such as window wipers, lights and defrosters.

Driver activity not directly related to driving may be monitored. Seat sensors and/or infrared sensors may sense the number and locations of passengers in the vehicle. Floor and steering wheel sensors may indicate the position of the driver's feet and hands. Video or imaging sensors may monitor head, body, hand and feet movements of the driver (such as camera 32), and the operative states and driver usage of information, entertainment and Telematics systems may also be monitored. Other activities that are easily monitored include adjusting the radio, using a cellular telephone, obtaining navigation information, adjusting the environmental controls, and conversation level.

The workload manager 50 may also capture data directly related to vehicle operation by monitoring vehicle controls. While operating the vehicle 20, the driver is engaged in a number of different actions, such as, but certainly without limitation, applying the accelerator or brakes, turning the steering wheel, and using turn signals, windshield washer/wipers, window defoggers, etc. Data derived from the vehicle controls or other sensors may be used to evaluate cognitive load, for example, rate of change of the accelerator and brake, turn radius combined with vehicle speed, and electronic suspension settings are an exemplary few.

As will be appreciated, numerous sources of data exist within and about the vehicle environment that may be utilized by the workload manager 50. Several data types have been described above, others will be described in connection with the operation of the workload manager 50, and still others not specifically referred herein may be used without departing from the scope and spirit of the invention. It will be appreciated that as new technologies introduce new types and sources of data and new types and sources of information into the vehicle, the workload manager 50 may be adapted to utilize these additional sources of data.

In other words, the workload manager 50 will monitor anything of a technical nature that the driver might be touching or using in the cockpit of the vehicle so that the workload manager 50 knows as much as possible about what the driver is doing at any given moment. Further, the use of video and imaging technology, seat sensors and microphones in the cockpit allows the workload manager 50 to determine the location and position of the driver, the noise level, and the presence of passengers and other potential sources of distractions. The radar, laser, video and infra-red sensors deployed around the perimeter of the vehicle monitor pedestrian traffic and weather conditions, obstacles, lane markings, etc. The driver's present condition and driving performance may be inferred from direct measures, such as video, and from comparison of current performance with past performance and known good performance practices.

Ultimately, in one embodiment, the workload manager 50 uses the available inputs to determine when the vehicle 20, and correspondingly, the vehicle or driver is in one of several states. Depending on the location of the vehicle or driver, the determination of the state may include data received from other vehicles 20*b*-20*d* that is associated with particular geographic locations. Based on the state of the vehicle or driver, the workload manager 50 may prioritize the presentation of information to the driver. This may result in eliminating information or providing a modified version of the information. For instance, the workload manager 50 may divert the presentation of a vehicle status inductor until a later time if it is determined that the vehicle or driver is in a demanding driving state. The workload manager 50 may also just provide an audio version of the information if the vehicle or driver is in an intermediate driving state. The workload manager 50 may further present all information if the vehicle or driver is in a steady driving state.

Additionally, the workload manager 50 may include memory that can store a history of all the workload measurements made by the vehicle containing the workload manager 50 and other workload measurements measured and received from other vehicles. This type of historical information may be tied into a road map database or other geographic navigation system that can generate a map of likely locations of high workload that can be used by the driver or separately by the workload manager 50. Moreover, this type of historical information may be tied into a learning based algorithm that allows the system to learn where high workload areas may bet better over time. For instance, if the system is flagging a high workload area for a road construction, that condition may change over time when the road construction is complete.

Further explanations of specific algorithms and methods of establishing workload manager 50 states may be found in co-pending patent application, Ser. No. 10/748,549, filed on Dec. 30, 2003, entitled "Method and Apparatus for Classifying Vehicle Operator Activity States," by Kari Torkkola, Robert Leivian, and Noel Massey, Publication No. US-2004-0252027-A1, assigned commonly with the present application, the disclosure of which is hereby incorporated by reference herein in its entirety.

Figure 3:
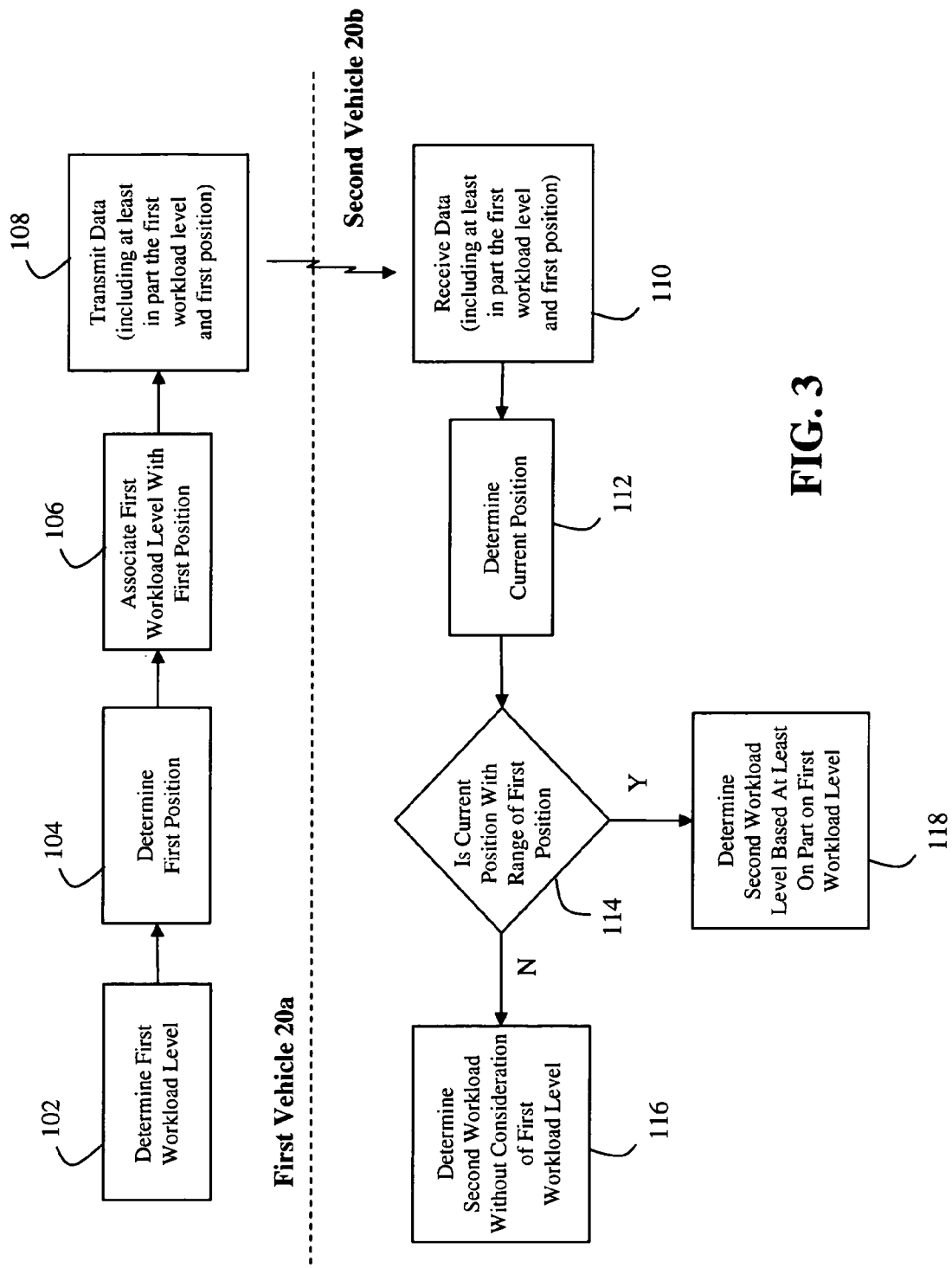
FIG. 3 is a flow diagram illustrating one embodiment of a method for sharing workload determination data between a first vehicle and a second vehicle.

FIG. 3 illustrates a summary of an operation of a workload determination system that incorporates data that is shared between a plurality of vehicles. In this example, there is an exchange of data between a first vehicle and a second vehicle. In process block 102, the workload manager 50 in the controller 22 of the first vehicle will determine a first workload level for a first driver. This may include classifying the driver activity state as described above, including consideration of the external environment and road conditions. Based on this classification, the workload manager may prioritize the presentation of information to the first driver in the vehicle. Additionally, the process may then proceed to block 104.

In block 104, the controller 22 of the first vehicle 20*a* determines a information of the first vehicle 20*a* such as a geographic position, a velocity, a heading, or an acceleration. For purposes of illustrating the present invention, the determined information will be a geographic position (i.e., a first position). However, as one of ordinary skill in the art with the benefit of this disclosure will recognize, other information such as a velocity, a heading, or an acceleration may also be determined and associated with a workload level. In any event, the first position can be done by receiving data from a positioning unit 36 (such as an on-board navigation system utilizing GPS technology), or location information may be provided by a wireless communication device (e.g., a cellular telephone) and associated wireless communication network.

At block 106, the controller 22 will then associate the first workload level with the first position. The controller 22 will then, in block 108, transmit the first workload level and the first position to a second vehicle using a wireless transceiver 56. The wireless communication between the vehicles may be direct (i.e. vehicle to vehicle) or through a remote service center 60. In block 110, the second vehicle will receive the data. This data may include the first workload level and the first position. The data may also be a compilation of information from a plurality of vehicles that includes, at least in part, the first workload level of the first vehicle.

In block 112, a controller 22 in the second vehicle 20*b* determines a current position of the second vehicle 20*b*. Again, this can be done by receiving data from a positioning unit 36 (such as an on-board navigation system utilizing GPS technology), or location information may be provided by a wireless communication device (e.g., a cellular telephone) and associated wireless communication network.

At decision block 114, the controller in the second vehicle 20*b* will then make a determination whether the current position of the second vehicle 20*b* is within a predetermined range of the first position associated with the received workload level from the first vehicle 20*a*. If the current position is not within the predetermined range, then a workload manager 50 in the second vehicle 20*b* will determine a second workload level without consideration of the data received in block 110. However, in block 118, if the current position is within the predetermined range, then the workload manager 50 in the second vehicle 20*b* will determine a second workload level based at least in part on the data received in block 110. Additionally, this decision block may further include fuzzy logic or a blended approach where the influence of the first workload level of the first vehicle 20*a* increases or decreases depending on how far the second vehicle 20*b* is away from the position associated with the first workload level.

Again, as mentioned above, the system is configured to prioritize the presentation of information in whole, in part, or in a modified format based on the workload level of the driver. Additionally, the present invention advantageously incorporates workload and location data from other vehicles to improve the workload determination. For instance, the experience obtained from one driver in a particular geographic location can be now used to the benefit of other drivers that pass through the particular geographic location.

What has been described is a system and method for determining a workload level for a driver of a vehicle. The above description of the present invention is intended to be exemplary only and is not intended to limit the scope of any patent issuing from this application. The present invention is intended to be limited only by the scope and spirit of the following claims.

What is claimed is:

1. A method for determining a workload level for a driver of a vehicle, the method comprising:

receiving data from a remote location, the data including a remote workload level and information associated with the remote workload level;

determining a current characteristic of the vehicle;

comparing the current characteristic of the vehicle with the information associated with the remote workload level;

determining a current workload level of the driver of the vehicle, the current workload level being based at least in part on the remote workload level.

2. The method in claim 1 wherein the information associated with the remote workload level includes at least a remote geographic position, a velocity, a heading, or an acceleration.

3. The method in claim 1 wherein the remote workload level is based on data from a plurality of sensors in at least a second vehicle.

4. The method in claim 1 further comprising the step of receiving data from a plurality of other remote locations, the data including a plurality of other remote workload levels, wherein the current workload level being based further on the plurality of other remote workload levels.

5. The method in claim 3 wherein at least one of the sensors is capable of identifying a road condition.

6. The method in claim 1 wherein the remote location is a central service center, the central service center being responsible for gathering a plurality of other workload levels from a plurality of other vehicles.

7. The method in claim 1 wherein the current workload level is used by a controller in the vehicle to prioritize information presented to the driver of the vehicle.

8. A method for determining workload levels of drivers in vehicles, the method comprising:

determining a first workload level for a first driver of a first vehicle;

determining a first position of the first vehicle;

associating the first workload level with the first position;

transmitting the first workload level and the first position to a second vehicle; and determining a second workload level for a second driver of the second vehicle, wherein the second workload level is determined at least in part based on the first workload level and the first position.

9. The method in claim 8 wherein the first workload level is based on data from a plurality of sensors in the first vehicle.

10. The method in claim 9 wherein at least one of the sensors includes an image sensor associated with a camera, the camera monitoring an external environment of the second vehicle.

11. The method in claim 9 wherein at least one of the sensors includes an image sensor associated with a camera, the camera monitoring an internal cabin of the second vehicle.

12. The method in claim 9 wherein at least one of the sensors is capable of identifying a road condition.

13. The method in claim 8 wherein the transmission of the first workload level to the second vehicle includes transmission through a central service center, the central service center responsible for gathering a plurality of other workload levels from a plurality of other vehicles.

14. The method in claim 8 wherein the second workload level is used by a controller in the second vehicle to prioritize information presented to the second driver of the second vehicle.

15. The method in claim 8 wherein a controller in the second vehicle compares the first position associated with the first workload level with a second position of the second vehicle, and wherein if the first position is within a predetermined range of the second position, then the second workload level is determined at least in part based on the first workload level.

16. A system for determining a workload level of a driver of a vehicle, the system comprising:
- a transceiver for receiving data from a remote location, the data including a remote workload level and a remote geographic position associated with the remote workload level;
- a positioning unit for determining a current position of the vehicle; and
- a controller for comparing the current position of the vehicle with the remote geographic position, and determining a current workload level, the current workload level determined at least in part based on the remote workload level if the current position of the vehicle is within a predetermined range of the remote geographic position.

17. The system in claim 16 wherein the received data is derived from a plurality of sensors in a second vehicle.

18. The system in claim 17 wherein at least one of the sensors includes an image sensor associated with a camera, the camera monitoring an external environment of the second vehicle.

19. The system in claim 17 wherein at least one of the sensors includes an image sensor associated with a camera, the camera monitoring an internal cabin of the second vehicle.

20. The system in claim 17 further comprising user interface that provides information to the driver, the controller further prioritizing the information provided to the driver based at least in part on the remote workload level.

* * * * *